United States Patent Office 3,536,740
Patented Oct. 27, 1970

3,536,740
π-ALLYL TRANSITION METAL-ANION COMPOUNDS
Günther Wilke, Muelheim (Ruhr), Germany, assignor to Studiengesellschaft Kohle m.b.H., Muelheim (Ruhr), Germany
No Drawing. Continuation-in-part of applications Ser. No. 272,881, Apr. 15, 1963, Ser. No. 387,826, Aug. 6, 1964, Ser. No. 617,461, Feb. 21, 1967, and Ser. No. 663,229, Aug. 25, 1967, and a division of application Ser. No. 387,990, Aug. 6, 1964, and said application Ser. No. 387,826. This application Oct. 16, 1968, Ser. No. 769,474
Claims priority, application Germany, Apr. 18, 1962, St 19,116; Aug. 10, 1963, St 20,974, St 20,975, St 20,976
Int. Cl. C07f 7/00, 9/00, 11/00
U.S. Cl. 260—429
14 Claims

ABSTRACT OF THE DISCLOSURE

π-Allyl transition metal-anion compounds of Groups IVb, Vb and VIb of the Periodic System, useful as catalysts for the oligomerization and polymerization of olefins.

---

This application is a continuation-in-part application of application Ser. No. 272,881, filed Apr. 15, 1963, now abandoned; division of application Ser. No. 387,990, filed Aug. 6, 1964, now U.S. Pat. No. 3,429,777; division of application Ser. No. 387,826, filed Aug. 6, 1964, and continuation-in-part of such application now U.S. Pat. No. 3,379,706; continuation-in-part application of application Ser. No. 617,461, filed Feb. 21, 1967, now U.S. Pat. No. 3,468,921 and application Ser. No. 663,229, filed Aug. 25, 1967, now U.S. Pat. No. 3,432,530.

π-Allyl transition metal compounds were first made in 1959 by Smidt and Hafner, see Angewandte Chemie 71, 284 (1959). Further allyl metal compounds have been made by H. B. Jonassen, J. Amer. Chem. Soc. 80, 2586 (1958); R Huttel u. J. Kratzer, Angew. Chem. 71, 456 (1959); I. I. Moiseev, E. A. Federowskaya u. Y. K. Syrkin, J. anorg. Chem. (Russ.) 4, 2641 (1959). These products generally contained additional ligands besides the π-allyl group therein.

Wilke and Bogdanovic showed, in Angewandte Chemie, vol. 73 (1961), p. 756, that it is possible to produce carbonyl-free bis-π-allyl nickel by the reaction of anhydrous nickel bromide and allyl magnesium chloride. Thus, for the first time there was prepared a π-allyl transition metal compound containing no other ligands than π-allyl groups.

Some π-allyl-Me-X compounds are already known. Thus, E. O. Fischer and G. Burger (Z. Naturforsch. 16b, 77 (1961) Report 94, 2409 (1961)) have for the first time described the preparation of the π-allyl-nickel bromide from the extremely poisonous nickel carbonyl and allyl bromide. The yields were given as only 11% of theory. Also known is the conversion of butadiene-iron-tricarbonyl with anhydrous chloride (F. J. Impastato and K. G. Ihrman, J. Am. Chem. Soc. 83, 3276 (1961)), which leads to the formation of a π-crotyl-iron-tricarbonyl-chloride.

However, these methods for the preparation of these compounds are unsatisfactory since the reaction products can be obtained only in low yields and since it is necessary to proceed for their production from the generally extremely poisonous metal carbonyls. A further disadvantage of these processes consists therein, that frequently not the pure compounds of the above named type are formed, but that complexes result in which still further substituents, such as for example CO-groups, are contained.

It is an object of this invention to provide new π-allyl-transition metal anionic compounds. More particularly π-allyl-transition metal anionic compounds of metals of Groups IVb, Vb and VIb are concerned.

As used herein, the Periodic Table which is referred to is that which is used by the International Union of Pure and Applied Chemistry.

The products of this invention are useful as catalysts for the oligomerization and polymerization of olefins and diolefins and the like, particularly for instance ethylene, propylene, butadiene and isopren.

The compounds of the invention of the type π-allyl-Me-X correspond to the general formula

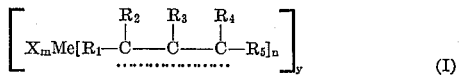
(I)

wherein X is an anion, Me is a transition metal of groups IVb, Vb and VIb of the Periodic Table, m and n are each an integer of 1–3 and m+n are equal to 2–4; $R_1$ to $R_5$ which may be similar or different, may in general be any organic radical or hydrogen. It may also be that the "allyl"-group may be part of a closed ring system, in which class $R_1$ or $R_2$ and $R_4$ or $R_5$ will together form an organic olefinic unsaturated ring system.

In particular, the $R_1$ to $R_5$ groups are suitably hydrogen, alkyl, cycloalkyl, aralkyl, aryl, alkylene (in the case of the allyl group being part of a closed ring system) or cycloalkylene (in the case of the allyl group being part of a closed bicyclo ring system). Exemplary of the substituent groups $R_1$ through $R_5$ set forth above, there are methyl, ethyl, propyl, butyl, 2-ethylhexyl, nonyl, dodecyl, octadecyl, cyclopentyl, cyclohexyl, cyclooctyl, cyclododecyl, phenyl, tolyl, naphthyl, and t-butyl phenyl. It is within the scope of this invention that the terminal carbon atoms of the allyl group may be joined by a bridging divalent aliphatic hydrocarbon such as, for example, an alkylene or alkenylene group to form a saturated or unsaturated ring compound containing at least one planar allyl grouping therein. This ring compound may itself be substituted as, for example, by one or more lower alkyl groups having up to about 6 carbon atoms in normal or isomeric configuration. Where a ring containing allyl moiety is utilized in the practice of this invention, such ring may contain between about 3 to 12 carbon atoms therein and may, in addition as set forth above, have one or more alkyl substituents thereon.

The transition metals generally described above are exemplified by zirconium, titanium, vanadium, niobium, tantalum, chromium, molybdenum and tungsten.

It was found that π-allyl-Me-X compounds of the general formula may be produced very easily and with practically quantitative yields directly from the π-allyl compounds of the transition metals of Groups IVb, Vb and VIb of the Periodic System having at least twice the effective grouping

(II)

bonded to Me as shown in the general Formula III

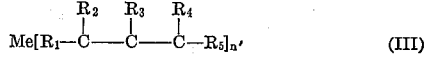
(III)

wherein Me and $R_1$ to $R_5$ are defined as above and $n'$ is an integer from 2 to 4.

I have discovered that these π-allyl-Me compounds in which the π-allyl moiety is present at least twice, form π-allyl-Me-X compounds when reacted, such as by contacting, with an acid of the type HX. The anionic radical X⁻ attaches to the transition of the π-allyl compound and the liberated H⁺ splits off one of the allyl radicals and is thus removed.

The reaction in accordance with the invention proceeds with HX according to the equation:

$$\pi(C_3H_5)_3Cr + HCl \rightarrow \pi(C_3H_5)_2CrCl + C_3H_6$$

Thus, for each equivalent HX, one equivalent of allyl radical is detached from the transition metal.

In similar manner, the compounds of the type π-allyl-Me-X may be produced if one proceeds from complexes of transition metals with exclusive multiple olefins by reacting these with an acid HX. The expression "exclusive multiple olefins" means hydrocarbon moieties which have olefinic unsaturation as the sole functional group or groups. Complexes of transition metals with exclusive multiple olefins can be produced, for example, according to my copending application Ser. No. 104,221.

Compounds of the type HX are preferably anhydrous hydrogen halides, though also other acid compounds, for example, organic acids and particularly carboxylic acids, for instance, acetic acid as well as phenols, thiophenols, mercaptans, hydrocyanic acid and 1,3-diketones (enol form) may be used.

Furthermore, the π-allyl-Me-X compounds can also be produced by reacting the π-allyl-Me compounds in which the π-allyl moiety is present at least twice, with a halogen in lieu of an acid (H⁺X⁻). In this case, the halogen attached to the transition metal displacing an allyl radical. The reaction in accordance with the invention, using a halogen instead of an HX compound, proceeds according to the Equation 2.

$$\pi(C_3H_5)_3Cr + I_2 \rightarrow \pi(C_3H_5)_2CrI + C_3H_5I \quad (2)$$

wherein for each equivalent of halogen reacted, formally one equivalent of allyl radical is detached from the transition metal. Preferred halogens are iodine and bromine.

The processes in accordance with the invention are advantageously carried out with solutions of the starting materials in solvents inert for the π-allyl metal compounds and the referred to complexes, since the reactions proceed in solution precisely stoichiometrically. Suitable solvents are aliphatic or aromatic ethers, cyclic ethers, saturated or aromatic and halogenated hydrocarbons substantially inert to these compounds and complexes. The conversions are preferably carried out at temperatures of from $-80°$ to $+100°$ C.

In most cases the reaction products result at once in crystallized form. In some cases the reaction products are recrystallized from suitable solvent solutions.

All operations in the following examples were carried out under exclusion of air and humidity, i.e., under a protective gas, such as for example argon or nitrogen, since the compounds producible in accordance with the invention are sensitive to air or humidity.

EXAMPLE 1

9 g.=52.4 mmol tris-π-allylchromium are converted in 1.5 l. ether at $-80°$ with 1.87=51.4 mmol anhydrous hydrogen chloride. The mixture is stirred for one hour and subsequently filtered over a G-4 frit. At $-20°$ the solvent is removed and the residue subsequently dried at $10^{-4}$ torr. The yield of bis-π-allyl-chromiumchloride amounts to 80%. A sample recrystallized from ether shows the following composition: $(Cr(C_3H_5)_2Cl)_2$. Calculated:MW, 339.22; Cr, 30.65%; Cl, 20.95%. Found: MW, 333; Cr, 30.48%; Cl, 21.20%.

EXAMPLE 2

5.5 g.=31.4 mmol tris-π-allylchromium are dissolved in 350 cm.³ ether and converted at 0° with a solution of 3.99 g.=15.7 mmol iodine in 100 cm.³ ether. The mixture is stirred overnight at 0° and subsequently concentrated in vacuum to about 50 cm.³. Brown crystals separate. For the completion of the crystallization one cools to $-60°$ and then filters off the reaction product. One washes with a little ether at $-80°$ and subsequently one dries at $10^{-4}$ torr. The yield of bis-π-allyl-chromiumiodide amounts to 7 g.=85% of the theory. $(Cr(C_3H_5)_2I)_2$: Calculated:MW, 522.13; Cr, 19.92%; I, 48.61%. Found: MW, 490; Cr, 19.95%; I, 48.25%.

EXAMPLE 3

1.92 g.=7.53 mmol tetra-π-allylzirconium are dissolved in 200 cc. ether at $-80°$ C. The reaction vessel is evacuated, whereupon 337.6 N cc.=0.55 g.=10.6 mmol of dry HCl gas is admitted with stirring and vigorous cooling. Upon termination of the reaction the solution is concentrated to about 50 cc. whereby the bis-π-allylzirconium-dichloride precipitates in the form of fine, light yellow crystals. The crystals are collected on a clay plate at low temperatures, washed with a little cold ether and then dried in vacuum on the plate. There is obtained 1.2 g.=4.92 mmol of the product, i.e., the yield is 65% of theory. The yield may be increased by further concentrating the filtrate. The bis-π-allylzirconium-dichloride decomposes at 20° C. in the course of a few hours. On reaction with alcohol there are obtained 2 mol propylene per gram atom zirconium.

EXAMPLE 4

2.33 g.=24.8 mmol phenol are dissolved in 50 cc. of ether and added dropwise at $-40°$ C. to a solution of 4.35 g. 24.8 mmol of tris-π-allylchromium in 100 cc. of ether. The mixture is kept at $-10°$ C. for 12 hours. Brownish crystals are precipitated thereby. The mixture is cooled to $-80°$ C. and the crystals are separated. The residue is washed with small amounts of ether and dried at $-80°$ C. and $10^{-4}$ mm. Hg. There are obtained 3.9 g.=70% of theory of bis-π-allylchromiumphenolate in the form of brownish crystals which correspond to $(C_3H_5)_2Cr(OC_6H_5)$.

EXAMPLE 5

0.93 g.=2.66 mmol of tetra-π-allyl-tungsten dissolved in 50 ml. of pentane are reacted at $-80°$ C. with 70 cc.=2.66 mmol of gaseous hydrogen chloride. The mixture is warmed up to $-30°$ C., while vigorously stirring. A yellow precipitate is formed which is separated and dried at $10^{-4}$ mm. Hg. There are obtained 0.7 g.=77% of theory of tris-π-allyl-tungsten chloride which corresponds to $(C_3H_5)_3WCl$.

EXAMPLE 6

133 cc. of a 0.026 molar dark green colored solution of tetra-π-allyl-tantalum (3.5 mmol) in ether are reacted at $-80°$ C. with 256 mg. (7 mmol, 156 N cc.) gaseous hydrogen chloride while vigorously stirring. The hydrogen chloride has been absorbed steadily, the color of the solution changed within four hours to yellow-brown. After filtration of small quantities of a colorless precipitate there has been determined in the solution the mol ratio of Ta:Cl:$C_3H_5$ as 1:2:2. The molarity of tantalum compound has dropped from originally 0.026 to 0.024, the yield of $Cl_2Ta(C_3H_5)_2$ is 92%.

The properties, activity and reactivity of the π-allyl metal compounds herein described are solely due to the π-allyl linkage and the particular stereo positioning of atoms thereby defined.

What is claimed is:

1. π-Allyl transition metal anion compounds of the formula $$\left[ X_mMe[R_1 - \underset{\underset{\displaystyle}{|}}{\overset{R_2}{C}} - \underset{\underset{\displaystyle}{|}}{\overset{R_3}{C}} - \underset{\underset{\displaystyle}{|}}{\overset{R_4}{C}} - R_5]_n \right]_y$$

wherein X is an anion derived from a hydrogen halide, a carboxylic acid, a phenol, a thiophenol, a mercaptan, hydrocyanic acid, or a β-diketone; Me is a transition metal selected from the group consisting of metals of Groups IVb, Vb, and VIb of the Periodic Table; $m$ is 1 or 2 and $n$ is 2 or 3; $m+n$ are 2 to 4; $y$ is 1 to 2; and $R_1$ to $R_5$ are each a substituent selected from the group consisting of hydrogen, alkyl having up to 18 carbon atoms, cycloalkyl having up to 12 carbon atoms in the ring, aralkyl having up to about 10 carbon atoms, aryl having up to about 10 carbon atoms in 1 or 2 rings, and $R_1$ or $R_2$ and $R_4$ or $R_5$, together with said $\pi$-allyl group can form a closed hydrocarbon ring containing no benzenoid or acetylenic unsaturation therein.

2. Compounds as claimed in claim 1, wherein said transition metal is a member of the group consisting of zirconium, titanium, tantalum, vanadium, niobium, chromium, molybdenum and tungsten.

3. Compounds as claimed in claim 1, wherein said anion X is selected from the group consisting of chloride, bromide and iodide.

4. Compounds as claimed in claim 1, wherein said anion X is selected from the group consisting of acetate, acetylacetonate and phenolate.

5. Compounds as claimed in claim 1, wherein said alkyl is methyl, cycloalkyl is cyclohexyl, aryl is phenyl and said ring has about 4 to 12 carbon atoms therein.

6. Compounds as claimed in claim 1, wherein said Group IV$b$ transition metal is zirconium.

7. Compounds as claimed in claim 1, wherein said Group V$b$ transition metal is tantalum.

8. Compounds as claimed in claim 1, wherein said Group VI$b$ transition metal is chromium.

9. Compounds as claimed in claim 1, wherein said Group VI$b$ transition metal is tungsten.

10. Bis-$\pi$-allyl-chromium-chloride.
11. Bis-$\pi$-allyl-chromium-iodide.
12. Bis-$\pi$-allyl-chromium-phenolate.
13. Bis-$\pi$-allyl-zirconium-dichloride.
14. Tris-$\pi$-allyl-tungsten-chloride.

References Cited

UNITED STATES PATENTS 3,080,305   3/1963   Gorsich _____ 204—158

OTHER REFERENCES

Chatt et al.: J. Chem. Soc., 1960, pp. 1718–21.

TOBIAS E. EVOW, Primary Examiner

A. P. DEMERS, Assistant Examiner

U.S. Cl. X.R.

252—429, 431; 260—429.3, 429.5, 438.5